(12) United States Patent
Haessig et al.

(10) Patent No.: US 12,259,151 B2
(45) Date of Patent: Mar. 25, 2025

(54) HVAC MOTOR AUTOMATION CONTROL UNIT AND ADJUSTMENT METHODS AND APPARATUS FOR SAME

(71) Applicant: Evolution Controls Inc., Poway, CA (US)

(72) Inventors: David Lee Haessig, Poway, CA (US); Ronald Sai Kit Yip, Poway, CA (US); Roger Hort, Poway, CA (US)

(73) Assignee: Evolution Controls Inc., Poway, CA (US)

( * ) Notice: Subject to any disclaimer, the term of this patent is extended or adjusted under 35 U.S.C. 154(b) by 410 days.

(21) Appl. No.: 17/579,229

(22) Filed: Jan. 19, 2022

(65) Prior Publication Data

US 2022/0228768 A1  Jul. 21, 2022

Related U.S. Application Data

(60) Provisional application No. 63/140,123, filed on Jan. 21, 2021.

(51) Int. Cl.
| | |
|---|---|
| *F24F 11/88* | (2018.01) |
| *F24F 11/52* | (2018.01) |
| *F24F 11/65* | (2018.01) |
| *G05D 23/19* | (2006.01) |
| *H02P 5/50* | (2016.01) |

(52) U.S. Cl.
CPC .............. *F24F 11/88* (2018.01); *F24F 11/52* (2018.01); *F24F 11/65* (2018.01); *G05D 23/1917* (2013.01); *H02P 5/50* (2013.01)

(58) Field of Classification Search
CPC .. F24F 11/88; F24F 11/52; F24F 11/65; H02P 5/50
See application file for complete search history.

(56) References Cited

U.S. PATENT DOCUMENTS

| | | | | |
|---|---|---|---|---|
| 5,410,230 | A | * | 4/1995 | Bessler .................... F24F 11/76 |
| | | | | 34/562 |
| 9,920,944 | B2 | * | 3/2018 | Chromy ................... F24F 11/52 |
| 10,215,436 | B1 | * | 2/2019 | Rawski .................... F24F 11/86 |

(Continued)

OTHER PUBLICATIONS

Evolutions Controls Inc., Automation Interface EC Motor, Series 1, Sep. 2, 2020, http://www.gotoevo.com/, San Diego, California, USA.

(Continued)

*Primary Examiner* — Mohammad Ali
*Assistant Examiner* — Vincent W Chang
(74) *Attorney, Agent, or Firm* — Weintraub Tobin; Jo Carothers (57) ABSTRACT

A method and apparatus for an automation control unit (ACU) for converting an automation control signal to a pulse width modulation (PWM) signal to control the output of a HVACR device such as a variable speed (VS) motor in an HVAC system is disclosed. The invention limits the motor output between a high and low limit, keeping the connected HVACR device operating within a safe range for the HVAC equipment. The invention simplifies commissioning of HVACR devices, constrains the equipment to operate within its designed operating range, optimizes energy efficiency of the HVAC equipment and minimizes disturbance in the controlled environment.

34 Claims, 9 Drawing Sheets

(56) References Cited

U.S. PATENT DOCUMENTS

| | | | | |
|---|---|---|---|---|
| 10,627,128 B1* | 4/2020 | Zhang | ............... | F24F 11/77 |
| 2012/0273581 A1* | 11/2012 | Kolk | ............... | F24F 11/30 |
| | | | | 236/91 D |
| 2012/0290136 A1* | 11/2012 | Romanowich | ........... | F24F 11/65 |
| | | | | 236/49.3 |
| 2013/0162184 A1* | 6/2013 | Koo | ............... | H02P 6/17 |
| | | | | 318/400.04 |
| 2013/0287627 A1* | 10/2013 | Livchak | ............... | B01D 53/007 |
| | | | | 422/3 |
| 2014/0260692 A1* | 9/2014 | Sharp | ............... | F24F 11/74 |
| | | | | 73/863.23 |
| 2015/0276253 A1* | 10/2015 | Montalvo | ........... | H04L 12/2827 |
| | | | | 700/276 |
| 2020/0248914 A1* | 8/2020 | Yagy | ............... | F24F 11/88 |
| 2021/0265898 A1* | 8/2021 | Reed | ............... | G01D 5/145 |

OTHER PUBLICATIONS

ICM Controls, ICM711 GE 2.3 ECM Controller Installation, Operation & Application Guide, www.icmcontrols.com, USA.
RTC-Solutions, EC Motor Control FSC-1, www.RTC-Solutions.com, Davie, Florida, USA.
Price Industries, ECM Price Standard ECM Speed Controller, www.priceindustries.com/contact/product-support.
Hoffman Controls, Product Data 791-ECM(VmA) ECM Motor Speed Controllers, www.hoffmancontrols.com, Dallas, Texas, USA.
Nidec Motor Corporation, Rescue PerfectSpeed ECM with User Interface for enhanced capabilities, Sep. 2019, 19-8542-01 Rev. 09/19, Nidec Motor Corporation.

* cited by examiner

FIG. 1

ACU Digital Adjustment Profile 3000

Registers

| | | |
|---|---|---|
| 3010 | Startup Counter | (any number between 0 and max specified) |
| 3020 | Off Delay | Delay time between input signal going to zero and flow output going to 0% |
| 3030 | POT Feedback | RPM output reads pot position |
| 3040 | Pulses Per Turn | Pulses per turn from the connected motor |
| 3050 | High Out Limit | Maximum percent allowed from the output |
| 3060 | Low Out Limit | Minimum percent allowed from the output |
| 3070 | Ramp | Change n%/s when enabled |
| 3080 | Min Display | The displayed value when the output signal is 0% |
| 3090 | Max Display | The displayed value when the output signal is 100% |
| 3100 | RPM Inputs | Number of RPM inputs |

HVAC MOTOR AUTOMATION CONTROL UNIT AND ADJUSTMENT METHODS AND APPARATUS FOR SAME

CROSS-REFERENCE TO RELATED APPLICATIONS

This application claims priority under 35 U.S.C. Section 119(e) to U.S. Provisional Patent Application No. 63/140,123, filed on Jan. 21, 2021, the entire disclosure of which is incorporated herein by reference.

FIELD OF THE INVENTION

The present invention relates generally to local and automated system adjustment devices for motors and other components in heating, ventilating, air-conditioning, and refrigeration ("HVACR") systems.

BACKGROUND OF THE INVENTION

HVACR machines are often fitted with one or more variable output, or variable speed, motors ("VS motors"), air valves, water valves, or other signal-controlled HVACR devices where the output is controlled in proportion to a control signal supplied by a local controller, interface, or automation system.

A control unit for one of these VS Motors or for other HVACR devices converts the automation control signal into a proportional pulse width modulated ("PWM") signal. The control unit outputs a PWM signal to the VS Motor or other HVACR device. The VS Motor or other HVACR device returns a proportional signal, pulse rate signal, or other pulse signal that represents device output such as speed, torque, or mass air flow. The output by a motor is commonly expressed as revolutions per minute ("RPM"). Torque is commonly expressed as ounce-feet ("oz-ft.") or gram-centimeters ("g-cm"). Mass airflow is commonly expressed as pounds per minute ("lbs./min") or grams per second ("g/sec"), but one of skill in the art commonly simplifies the expression to cubic feet per minute ("CFM") or cubic meters per second ("CMS").

The control units may also have some form of manual adjustment, such as a rotating knob, increase-decrease buttons, or other form of adjustment mechanism. The manual adjustment can be set permanently or for a certain amount of time. The control units also have some form of display to indicate an adjustment setting and an analog output signal that is proportional to the motor's RPM.

However, HVACR machines often have unique operating conditions. Therefore, there is a need to provide a mechanism for a range of special features for the control units to optimize performance while allowing certain features and parameters to not have to be changed or adjusted in the field.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

According to various embodiments, the invention and disclosure herein uses a digital adjustment profile ("DAP") in an automation control unit ("ACU"). In one embodiment, a method and apparatus for an ACU for converting an automation control signal to a pulse width modulation (PWM) signal to control the output of a HVACR device such as a VS Motor in an HVACR system is disclosed.

In various embodiments, the disclosure and invention provide a mechanism and technique to set values and flags in the ACU that support unique features to the ACU such as a Start Up Counter, RPM PPT (Revolutions Per Minute, Pulse Per Turn) Selection, Manual Adjuster Feedback, Output Limits, Output Ramping, Output Delayed Shutdown, Output Signal Display Scaling, and Multiple Motor RPM Averaging.

All the above features in the invention can be configured using a digital device to avoid the HVACR system being adjusted in the field since certain adjustments are set by the equipment manufacturer and should not be adjusted in the field. In various embodiments, using the disclosed invention, equipment manufacturers can develop DAPs to customize the ACU to their unique product needs.

In one embodiment, the Output Display Scaling, which is the scaling value displayed by the local display, is scaled between the display values for any two percentage outputs between zero percent and one-hundred percent as defined in the DAP. In place of the traditional zero to one-hundred percent display, the disclosed invention allows customized measurement and display to users of data such as torque, CFM, actual control voltage and/or other engineering units associated with the controlled HVACR device. Measuring and displaying the adjustment in engineering units allows faster and more accurate adjustment.

In another embodiment, the Output Limits, which is the minimum allowed output and maximum allowed output signal to the VS Motor or other HVACR device, are defined in the DAP and then loaded into the ACU. When outputting the signal, the disclosed invention outputs a signal no lower than the minimum allowed percent output and no greater than the maximum allowed percent output. The disclosed invention limits the motor output between a high and low limit. Limiting the output allows the motor output to be constrained between high and low output limits to keep the connected VS Motor or other HVACR device operating within a safe range for the HVAC equipment In another embodiment, the Output Delayed Shutdown, which is the amount of time delay before the output signal to the VS Motor or other HVACR device goes to zero, causes the ACU output signal to remain at its current value until a delay timer expires. The disclosed invention allows setting an off delay, which allows the VS Motor or other HVACR device to continue running at the last commanded output for a predefined period after it has been turned off by the building automation system ("BAS") to optimize energy efficiency of the HVACR equipment.

In place of monitoring a single feedback rate from a single VS Motor or other HVACR device, the invention allows monitoring of an adjustable feedback rate of multiple VS Motors or other HVACR devices.

In another embodiment the number of startup cycles, or Startup Counter, can be defined in the DAP. This control can be used in manual mode when the BAS is not available. When the BAS becomes available, the Startup Counter allows the control to operate in automation mode automatically without the need to manually switch over at the control.

In another embodiment, the RPM Pulse Count Selection, which is the number of pulses per turn of the connected motor output by the connected VS Motor, is defined in the DAP and then loaded into the ACU. The disclosed invention allows a connected VS Motor to have any number of pulses per turn and correctly converts the actual RPMs to the proper analog signal.

In another embodiment, the ACU Output Limits changes to a certain pre-programmed rate, known as ramping, to reduce occupant awareness of HVACR system changes. The disclosed invention allows setting the ramping rate, which reduces occupant awareness of changes in airflow and minimizes disturbance due to noise level changes in the controlled environment In another embodiment, for the manual adjuster feedback, the ACU outputs a signal proportional to the manual adjuster. This allows automation systems to read air balance adjustments from the ACU.

In another embodiment where the control may be connected to multiple VS Motors or other HVACR devices and the feedback rate from each VS Motor or other HVACR device connects to the control. The control averages the feedback rate values from each VS Motor or other HVACR device and outputs the averaged signal.

The disclosed invention allows an option for returning the local adjust to the BAS to simplify commissioning of the building automation system. Often, the BAS is not installed yet when the HVACR equipment is running and controlled by the ACU local adjust in a new facility. This feature allows the BAS to read the local adjust setting to simplify the commissioning of the BAS.

Other objects, features, and advantages of the present invention will become apparent upon consideration of the following detailed description and the accompanying drawings.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. Reasonable variation and modification are possible within the scope of the forgoing disclosure and drawings without departing from the spirit of the invention. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

ACU Diagram 2000

Figure 1:
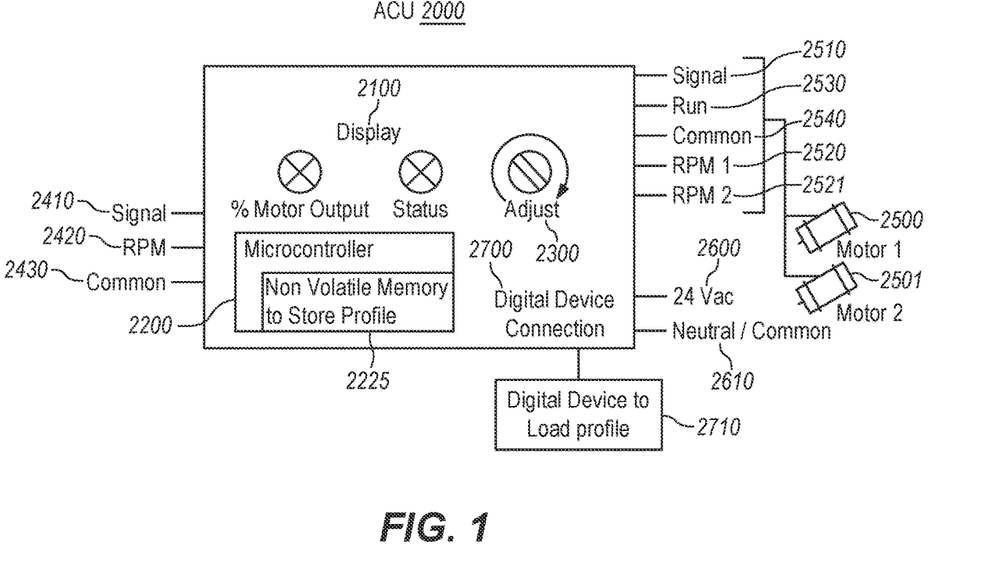
FIG. 1 illustrates a diagram of an ACU embodying the present invention.

FIG. 1 illustrates an example embodiment of a diagram of ACU 2000 embodying the present invention. ACU 2000 comprises a display 2100, a microcontroller 2200, a non-volatile memory 2225, a digital device connection 2700, a manually operated adjust 2300, a signal input 2410, a second output 2420, a common connection 2430, a first output 2510, a device signal input 2520, a run output 2530, a common 2540, a power input 2600, and a neutral/common 2610 for electrical return and safety ground. ACU 2000 connects to an HVACR device 2500. In various example embodiments, HVACR device 2500 can compromise a motor, a variable speed motor, also called a VS Motor, an air valve, a water valve, a temperature controller, or other signal-controlled device.

Display 2100 is used to display the RPM status and scaled value of the percentage output to the HVACR device 2500. Microcontroller 2200 executes various processes using the ACU digital adjustment profile 3000 (FIG. 2) stored in non-volatile memory 2225. Non-volatile memory 2225 can be either integrated with the microcontroller 2200 or connected to the microcontroller 2200 within ACU 2000. Non-volatile memory 2225 stores the ACU digital adjustment profile 3000 for access by the microcontroller 2200. Digital device connection 2700 is used to load the ACU digital adjustment profile 3000 from an external digital device 2710 to non-volatile memory 2225.

Manually operated adjust 2300 can be used to adjust the percent of signal output to the HVACR device 2500. Common connection 2430 serves as an electrical return path for the connected automation control 2410 and RPM signal 2420. First output 2510 connects to the HVACR device 2500 to set its output parameter such as its speed. Device signal input 2520 receives a signal from the HAVCR Device 2500 such as a signal from tachometer for a motor. Run output 2530 can be used to turn on HVACR device 2500. The second output 2420 outputs a signal that can be read by a building automation system (BAS) after the ACU 2000 converts the RPM pulses into an analog signal.

Common 2540 serves as an electrical return path for the HVACR device 2500. Power input 2600 powers the ACU and neutral/common 2610 is an electrical return and safety ground for Power input 2600. In one embodiment, power input 2600 comprises a 24-volt AC power connection.

In an alternative embodiment, first output 2510, run output 2530, common 2540 and second device signal input 2521 can be connected to a second HVACR device 2501. In this alternative embodiment, the display 2100 displays the average parameter status such as average RPMs for HVACR device 2500 and second HVACR device 2501.

ACU Digital Adjustment Profile 3000

Figure 2:
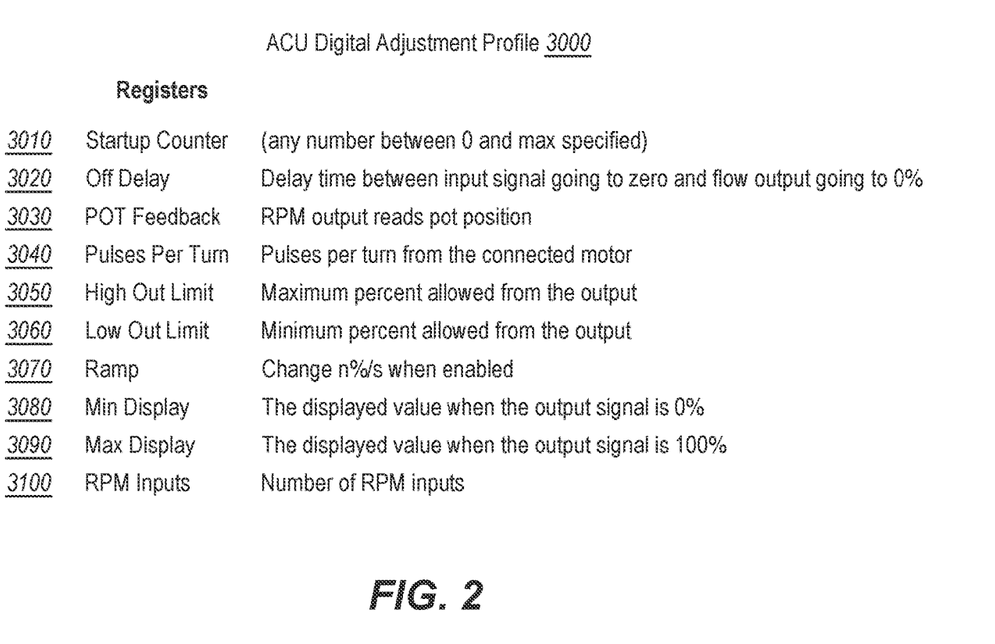
FIG. 2 provides a table of an example digital adjustment profile for the ACU.

FIG. 2 provides a table for an example ACU digital adjustment profile 3000 including Startup Counter 3010, Off Delay 3020, Pot Feedback 3030, Pulses Per Turn 3040, High Out Limit 3050, Low Out Limit 3060, Ramp 3070, Min Display 3080, Max Display 3090, RPM Inputs 3100.

The value of Startup Counter 3010 is the number of startup cycles. The startup feature allows operation without a BAS by putting the ACU 2000 into manual mode every time the ACU is turned on until the predefined number of startup cycles is exceeded, after that the ACU will change to automation mode.

A value of Off Delay 3020 is the delay time between the automation input signal going to zero and the output to VS Motor or other HVACR device going to zero percent. The ACU 2000 stays on for the duration of the Off Delay 3020 time when the automation signal requests the HVACR device to turn off.

Pot Feedback 3030 is when the manually operated adjust 2300 is converted into a voltage signal that is communicated to the BAS, which is controlling many devices in a building, and in one simple example embodiment can be a thermostat.

Pulses Per Turn 3040 is the number of pulses per turn from the HVACR device 2500.

High Out Limit 3050 is the maximum output in percent from the control to the HVACR device 2500. Low Out Limit 3060 is the minimum output in percent from the control to the HVACR device 2500.

When the BAS requests a change, the output will ramp up or down at a rate set by the value of Ramp 3070, such as five percent per second. The ramping feature reduces building occupant awareness of changes in airflow.

A value of Min Display 3080 is the display value when the output signal equals zero percent (0%) of the maximum potential output value. A value of Max Display 3090 is the display value when the output signal equals one-hundred percent (100%) of the maximum potential output value.

A value of RPM Inputs 3100 is the number of HVACR devices, which in an example embodiment is one, and in another example embodiment is two.

Processes for the ACU 2000

Figure 3:
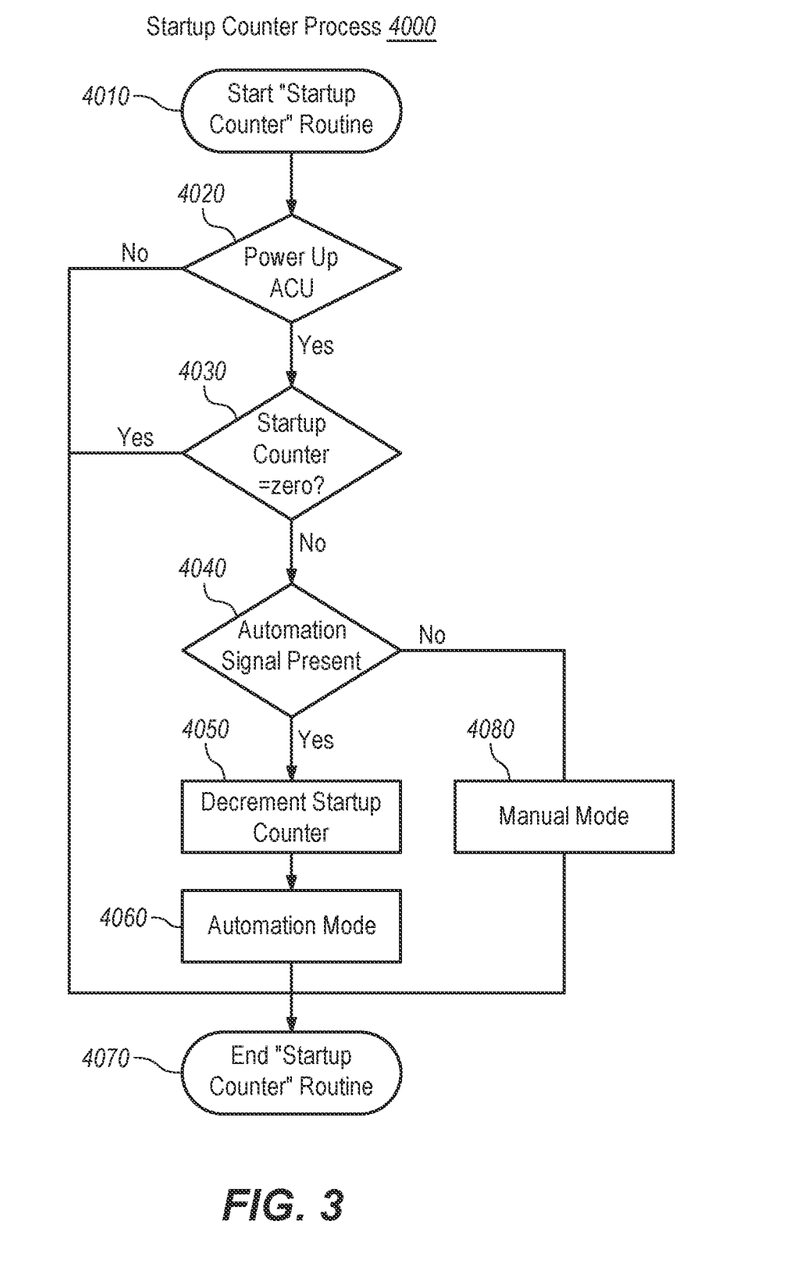
FIG. 3 illustrates an example embodiment for a Startup Counter Process for a Startup Counter.

FIG. 3 illustrates an example embodiment for Startup Counter Process 4000 for Startup Counter 3010. Startup Counter Process 4000 begins at step 4010. At step 4020, Startup Counter Process 4000 checks if ACU 2000 is in power up mode. If ACU 2000 is in power up mode, Startup Counter Process 4000 continues to step 4030 where Startup Counter Process 4000 checks if the Startup Counter 3010 is zero. If Start-up Counter 3010 is not zero, at step 4040 it is determined whether the Automation Signal, which is sent from the BAS and represents the output the HVACR device should produce, is present. If the Automation Signal is present, the Startup Counter 3010 is decremented at step 4050. Startup Counter Process 4000 then moves to step 4060 where ACU 2000 is put into Automation Mode. In automation mode the signal to the HVACR device is derived from the BAS. Startup Counter Process 4000 then ends at step 4070. Returning to step 4020, if ACU 2000 is not in power up mode Startup Counter Process 4000 then ends at step 4070. Returning to step 4030, if the Startup Counter 3010 is zero, Startup Counter Process 4000 ends at step 4070. Returning to step 4040, if the Automation Signal is not present, Startup Counter Process 4000 goes to step 4080 where ACU 2000 is put in Manual Mode where the control signal to the HVACR device is derived from the ACU 2000 adjuster setting. Startup Counter Process 4000 then ends at step 4070.

Figure 4:
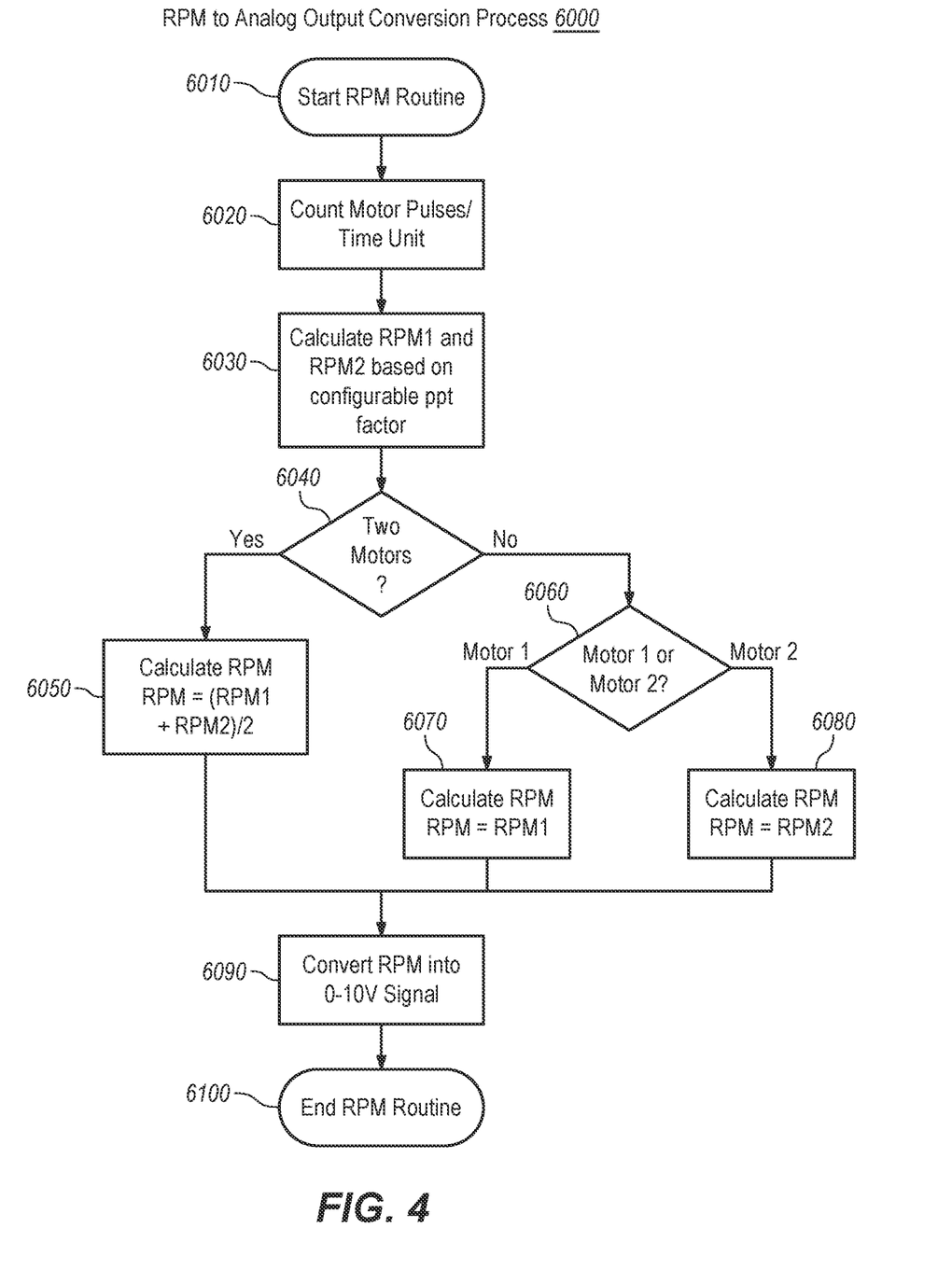
FIG. 4 illustrates an example embodiment of RPM to Analog Output Process of the present invention.

FIG. 4 illustrates an example embodiment of RPM to Analog Output Conversion Process 6000. RPM to Analog Output Conversion Process 6000 begins at step 6010. At step 6020, the pulses from HVACR device 2500 and/or second HVACR device 2501 are counted over a predefined period. Next, at step 6030, the accumulated pulses are converted to RPM of the respective HVACR device based on the configurable Pulses Per Turn 3040. At step 6040, the number of HVACR devices is used to average RPM Inputs 3100. If there are two HVACR devices, the average RPMs is calculated and used as the output RPM at step 6050. The output RPM is then converted into an analog signal at step 6090 and output to second output 2420. RPM to Analog Output Conversion Process 6000 then ends at step 6100.

Going back to step 6040, if there is only one HVACR device, Step 6060 determines whether HVACR device 2500 or second HVACR device 2501 is connected and used to output the RPM. If HVACR device 2500 is connected, the RPM from HVACR device 2500 is used to calculate the output RPM at step 6070. At step 6090, the output RPM is converted into an analog signal and output to second output 2420. RPM to Analog Output Conversion Process 6000 then ends at step 6100.

Going back to step 6060, if second HVACR device 2501 is connected, the RPM from HVACR device 2501 is used to calculate the output RPM at step 6080. The output RPM is converted into an analog signal at step 6090 and output to second output 2420. RPM to Analog Output Conversion Process 6000 then ends at step 6100.

Figure 5:
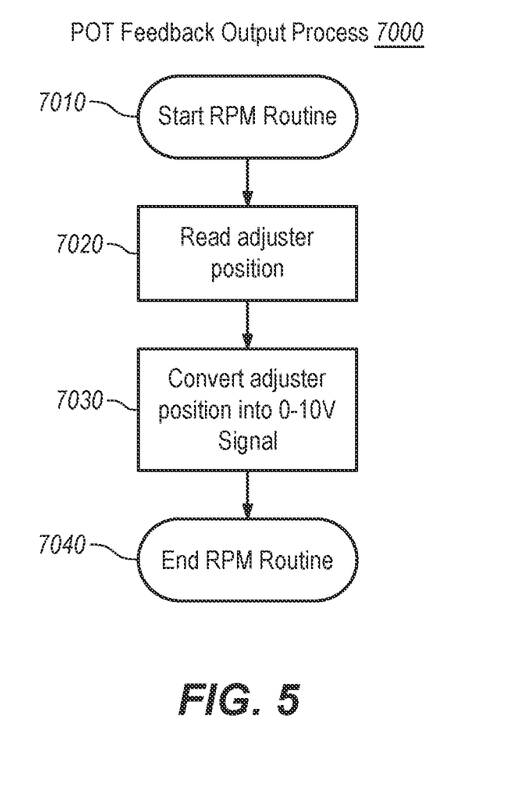
FIG. 5 illustrates an example embodiment of the POT Feedback Output Process of the present invention.

FIG. 5 illustrates an example embodiment of POT Feedback Output Process 7000 for device signal output 2520 when POT Feedback 3030 is enabled. POT Feedback Output Process 7000 begins at step 7010. At step 7020, the manually operated adjust 2300 is read. In manual mode the manually operated adjust 2300 is used to set the ACU output to a certain value. The manually operated adjust 2300 position represents the value set, where the manually operated adjust 2300 can be set between zero percent and one-hundred percent. At step 7030, the manually operated adjust 2300 position is converted into an analog output signal and output to second output 2420. POT Feedback Output Process 7000 then ends at 7040.

Figure 6:
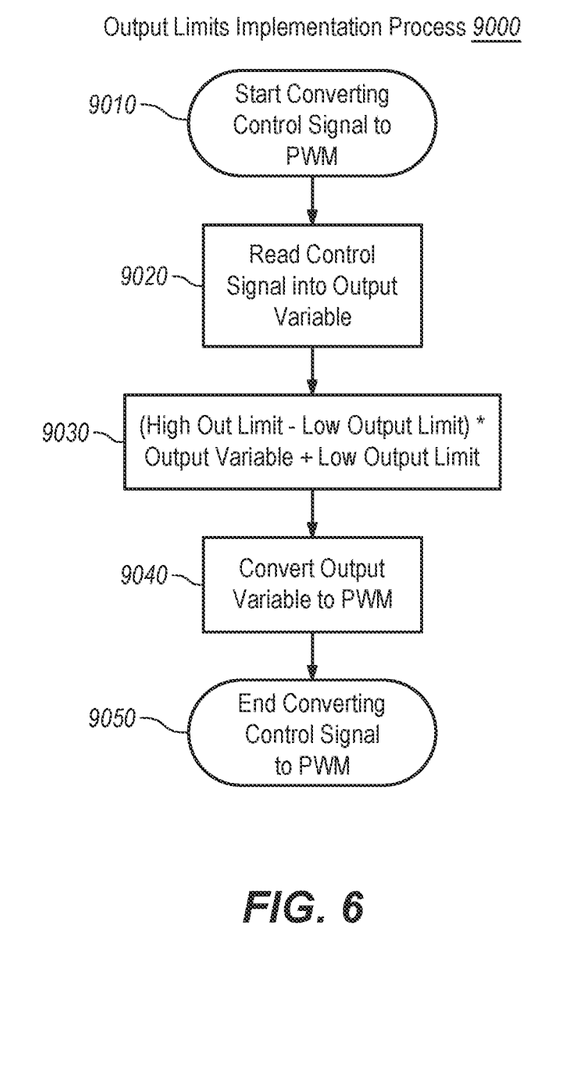
FIG. 6 illustrates an example embodiment of an output limits implementation process for the PWM signal output calculation of the present invention.

FIG. 6 illustrates an example embodiment of the output limits implementation process 9000 for the PWM signal output calculation. The output limits implementation process 9000 begins at step 9010. At step 9020, the control signal is read into Output Variable. Output variable is the ACU internal variable that is processed by applying limits or rate of change, and the result is sent to the run output 2530.

Output limits implementation process 9000 then moves to step 9030 where the Output Variable between 0% and 100% is scaled between the High Output Limit 3050 and Low Output Limit 3060 to determine the scaled output. Output limits implementation process 9000 then moves to step 9040 where the scaled output from step 9030 is converted to a PWM signal and outputted to first output 2510. Output limits implementation process 9000 then ends at step 9050.

Figure 7:
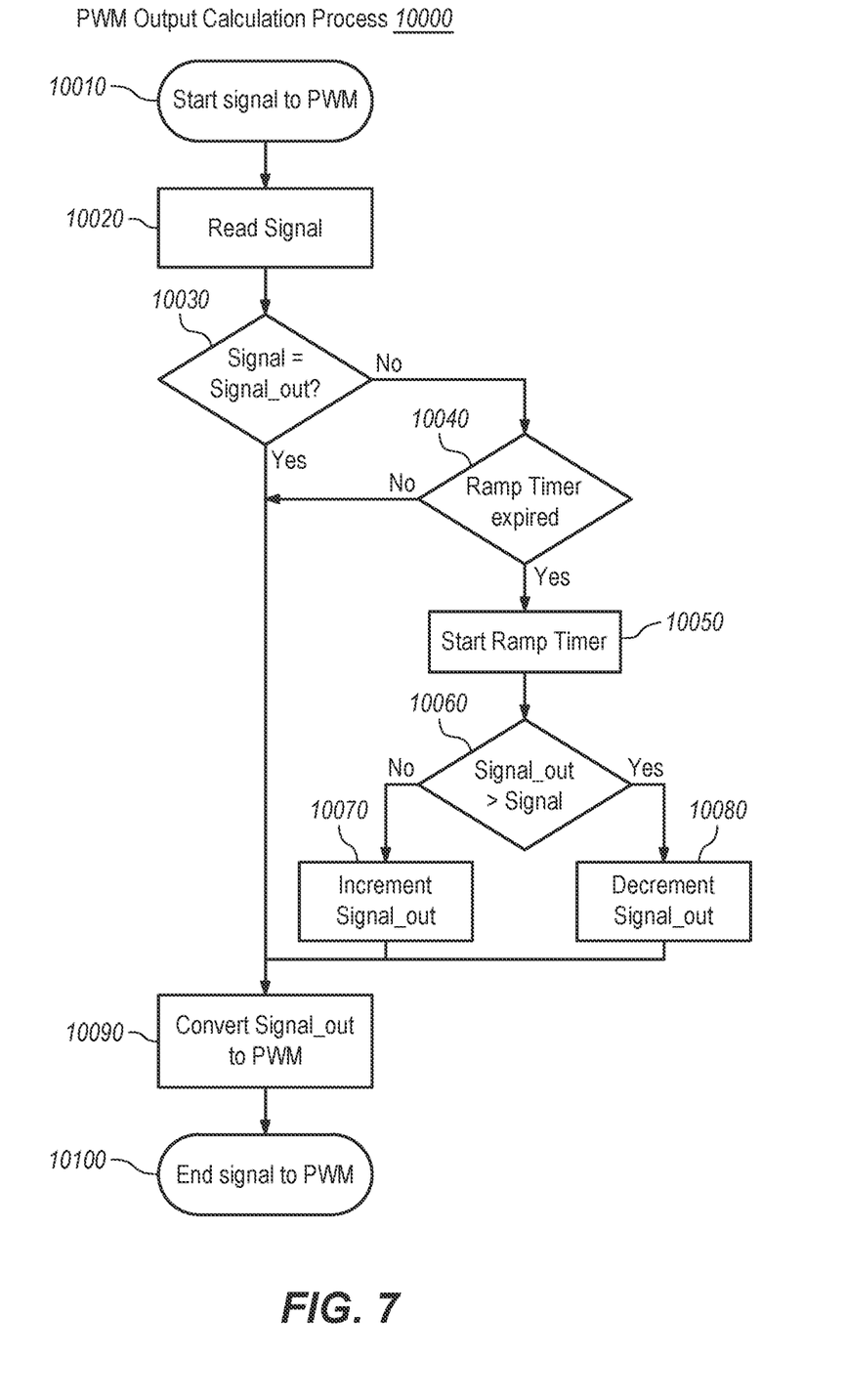
FIG. 7 illustrates an example embodiment of the PWM output calculation process of the present invention when a Ramp function is selected.

FIG. 7 illustrates an example embodiment of the PWM output calculation process 10000 when the Ramp 3070 function is selected. The PWM output calculation process 10000 starts at step 10010. At step 10020, the control signal is read. Next, at step 10030, the signal is compared to Signal_out. Signal_out is generated within the ACU 2000, and is incremented or decremented when the ramp timer expires. Ramp 3070 defines the rate of the Signal_out ramp, and is a repetitive signal, starting then turning off at the predefined time and then repeating.

If signal is equal to Signal_out, then PWM output calculation process 10000 moves to step 10090 where the Signal_out is converted to PWM and outputted to first output 2510. PWM output calculation process 10000 then ends at step 10100. Returning to step 10030, where PWM output calculation process 10000 checks if signal from the BAS is equal to Signal_out. If it is not equal, then PWM output calculation process 10000 moves to step 10040 where it is determined if the ramp timer has expired. If the ramp timer has not expired, PWM output calculation process 10000 moves to step 10090 where the Signal_out is converted to a PWM signal and outputted to first output 2510. PWM output calculation process 10000 then ends at step 10100.

Going back to step 10040, where PWM output calculation process 10000 checks if the ramp timer has expired, if the ramp timer has expired, PWM output calculation process 10000 moves to step 10050 to start the ramp timer. At step 10060, the signal is compared to Signal_out. If signal is less than Signal_out, then PWM output calculation process 10000 moves to step 10080 where Signal_out is decremented. PWM output calculation process 10000 then moves to step 10090 where the Signal_out is converted to PWM and outputted to first output 2510. PWM output calculation process 10000 then ends at step 10100.

Going back to step 10060, where signal is compared to Signal_out, if signal is larger than Signal_out, then PWM output calculation process 10000 moves to step 10070 where Signal_out is incremented. PWM output calculation process 10000 then moves to step 10090 where the Signal_out is converted to PWM and outputted to first output 2510. PWM output calculation process 10000 then ends at step 10100.

Figure 8:
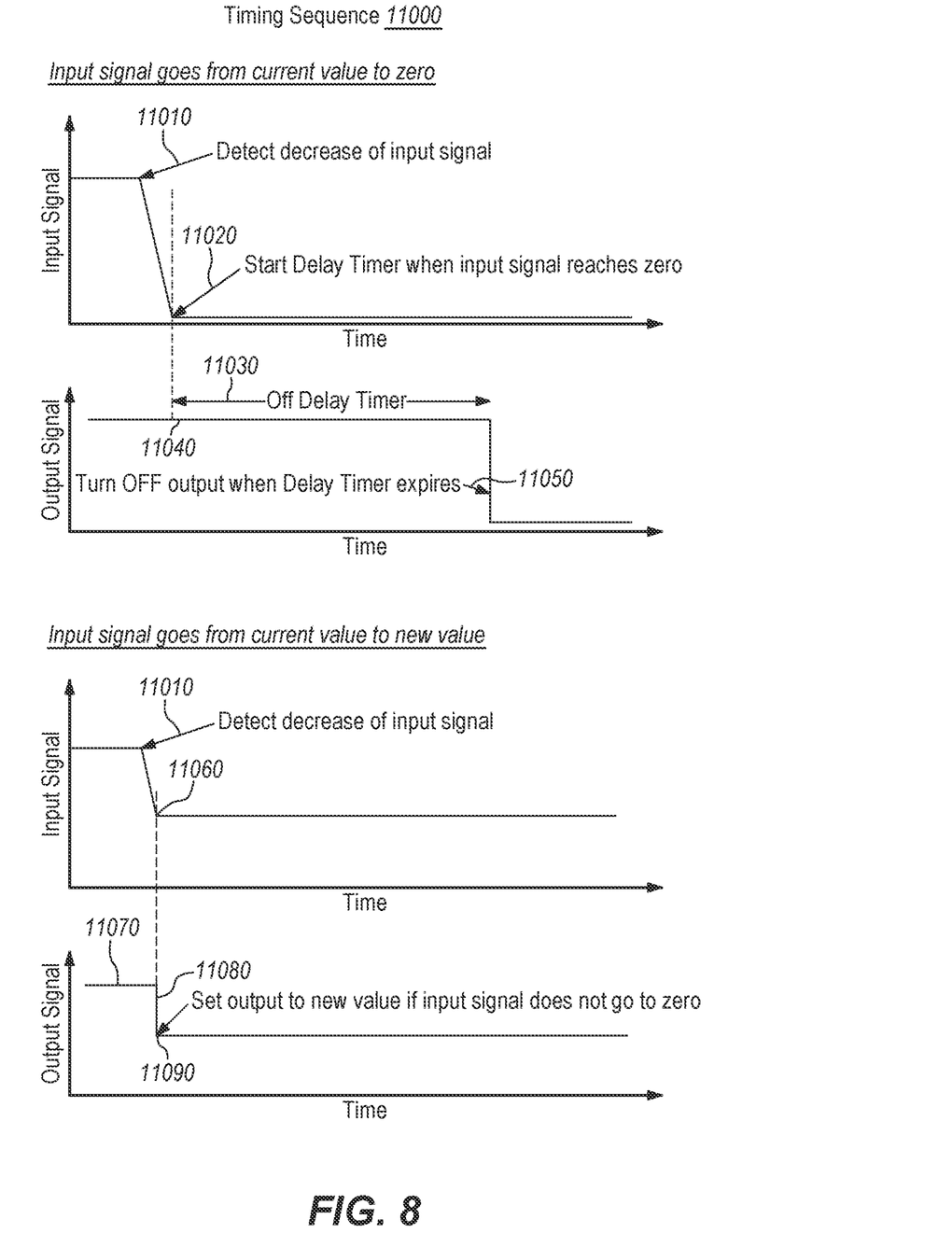
FIG. 8 illustrates a timing sequence of an output delayed shutdown of the present invention.

FIG. 8 illustrates the timing sequence 11000 of the output delayed shutdown, which is the time delay between the request to shutdown and the actual shutdown. There are two possible conditions. For condition one, the input signal goes from the current value to zero. For condition two, the input signal goes from the current value to a non-zero new value.

In condition one, the shutdown starts at 11010 where a decrease in input signal is detected. The output signal remains at its current level at 11040. Once the input signal reaches zero at 11020 the Off Delay Timer 11030 is started, and when the Off Delay Timer 11030 expires the output signal is turned off at 11050.

In condition two, the input signal again starts going low at 11010. However, the output signal remains at level at 11070 until the input signal reaches the new value at 11060. Then the output signal is set to the new value at 11090.

Figure 9:
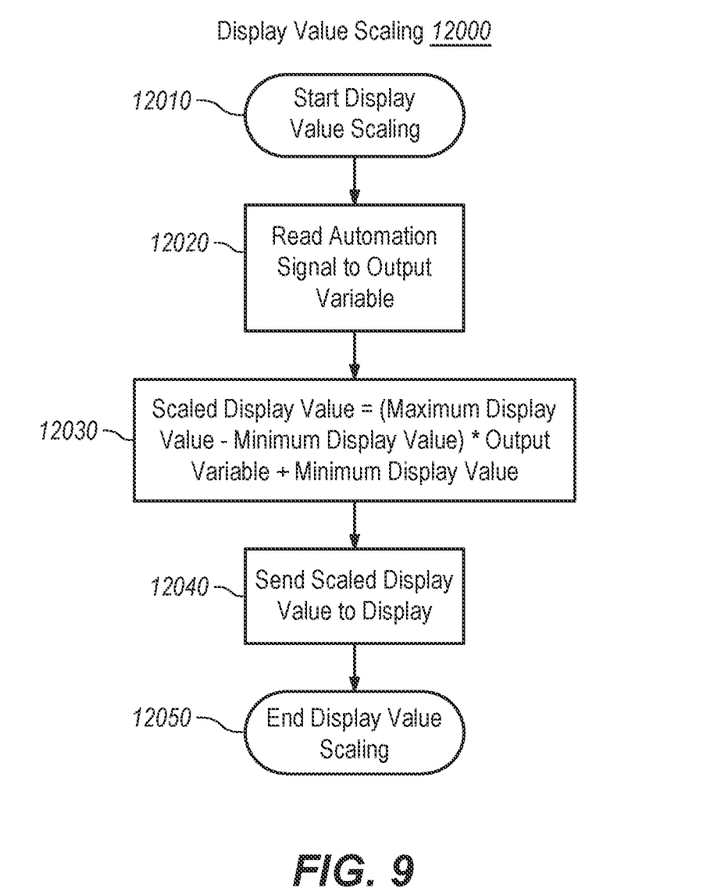
FIG. 9 illustrates an example embodiment display value scaling process of the present invention as calculated based on the Min Display and Max Display.

FIG. 9 illustrates an example embodiment display value scaling process 12000 according to the Min Display 3080 and Max Display 3090. The display value scaling process 12000 begins at step 12010. At step 12020, the automation signal is read into Output Variable. Display value scaling process 12000 then moves to step 12030 where the Output Variable between 0% and 100% is scaled between Min Display 3080 and Max Display 3090. The process moves to step 12040 where the Scaled Display Value from 12030 is sent to display 2100. Display value scaling process 12000 then ends at step 12050.

The disclosed embodiments are illustrative, not restrictive. While specific configurations have been described, it is understood that the present invention can be applied to a wide variety of applications. There are many alternative ways to implement the invention.

What is claimed is:

1. An automation control unit for heating, ventilating, air-conditioning, and refrigeration systems comprising:
    a power connection;
    an input to receive an input signal from a controlled heating, ventilating, air-conditioning, and refrigeration device;
    a display unit;
    a profile input for receiving a digital adjustment profile, wherein the digital adjustment profile comprises a plurality of values, and wherein one of the plurality of values of the digital adjustment profile comprises a value indicative of a number of startup cycles of the controlled heating, ventilating, air-conditioning, and refrigeration device;
    a non-volatile memory for storing the digital adjustment profile;
    a microcontroller connected to the non-volatile memory, wherein the microcontroller uses the digital adjustment profile and the input signal to determine an analog output signal, and wherein the microcontroller monitors the availability of an automation signal from a building automation system and the number of startup cycles of the controlled heating, ventilating, air-conditioning, and refrigeration device;
    a manually operated adjust for adjusting the analog output signal during a manual mode for the automation control unit;
    a first signal output for providing the analog output signal to the controlled heating, ventilating, air-conditioning, and refrigeration device;
    a second analog output for providing the analog output signal to the building automation system; and
    wherein the automation control unit is configured to automatically switch from the manual mode for the automation control unit to an automation mode for the automation control unit when the automation signal is available from the building automation system and the number of startup cycles of the controlled heating, ventilating, air-conditioning, and refrigeration device is exceeded.

2. The automation control unit of claim 1 wherein the non-volatile memory is integrated with the microcontroller on the same integrated circuit.

3. The automation control unit of claim 1 wherein the controlled heating, ventilating, air-conditioning, and refrigeration device comprises a motor.

4. The automation control unit of claim 3 wherein the motor comprises a variable speed motor.

5. The automation control unit of claim 4 wherein the input signal comprises a signal from a tachometer indicating RPM.

6. The automation control unit of claim 1 further comprising a run output to turn on the controlled heating, ventilating, air-conditioning, and refrigeration device.

7. The automation control unit of claim 1 wherein the power connection comprises a 24 Volt power connection.

8. The automation control unit of claim 1 wherein one of the plurality of values of the digital adjustment profile comprises a scaling value, wherein the scaling value is used to scale an output percentage into engineering units for displaying on the display unit.

9. The automation control unit of claim 1 wherein one of the plurality of values of the digital adjustment profile comprises a minimum value allowed for the analog output signal.

10. The automation control unit of claim 1 wherein one of the plurality of values of the digital adjustment profile comprises a maximum value allowed for the analog output signal.

11. The automation control unit of claim 10 wherein one of the plurality of values of the digital adjustment profile comprises a minimum value allowed for the analog output signal.

12. The automation control unit of claim 1 wherein one of the plurality of values of the digital adjustment profile comprises a value indicative of a time delay for the analog output signal.

13. The automation control unit of claim 1 wherein one of the plurality of values of the digital adjustment profile comprises a value indicative of a number of pulses per turn for the analog output signal.

14. The automation control unit of claim 1 wherein one of the plurality of values of the digital adjustment profile comprises a ramping rate for the analog output signal.

15. The automation control unit of claim 1 wherein the manually operated adjust is converted into a voltage signal for providing to the building automation system.

16. An automation control unit for heating, ventilating, air-conditioning, and refrigeration systems comprising:
    a power connection;
    an input to receive a first input signal from a first controlled heating, ventilating, air-conditioning, and refrigeration device, and a second input signal from a second controlled heating, ventilating, air-conditioning, and refrigeration device;
    a display unit;
    a profile input for receiving a digital adjustment profile, wherein the digital adjustment profile comprises a plurality of values, and wherein one of the plurality of values of the digital adjustment profile comprises a value indicative of a number of startup cycles of the first controlled heating, ventilating, air-conditioning, and refrigeration device and the second controlled heating, ventilating, air-conditioning, and refrigeration device;
    a non-volatile memory for storing the digital adjustment profile;
    a microcontroller connected to the non-volatile memory, wherein the microcontroller uses the digital adjustment profile, the first input signal, and the second input signal to determine an analog output signal, and wherein the microcontroller monitors the availability of an automation signal from a building automation system and the number of startup cycles of the first controlled heating, ventilating, air-conditioning, and refrigeration device and of the second controlled heating, ventilating, air-conditioning, and refrigeration device;
    a manually operated adjust for adjusting the analog output signal during a manual mode for the automation control unit;
    a first signal output for providing the analog output signal to the first controlled heating, ventilating, air-conditioning, and refrigeration device and the second controlled heating, ventilating, air-conditioning, and refrigeration device;
    a second analog output for providing the analog output signal to the building automation system; and
    wherein the automation control unit is configured to automatically switch from the manual mode for the automation control unit to an automation mode for the automation control unit when the automation signal is available from the building automation system and the number of startup cycles of the first controlled heating, ventilating, air-conditioning, and refrigeration device and the second controlled heating, ventilating, air-conditioning, and refrigeration device is exceeded.

17. The automation control unit of claim 16 wherein the non-volatile memory is integrated with the microcontroller on the same integrated circuit.

18. The automation control unit of claim 16 wherein the first controlled heating, ventilating, air-conditioning, and refrigeration device comprises a motor.

19. The automation control unit of claim 18 wherein the motor comprises a variable speed motor.

20. The automation control unit of claim 19 wherein the first input signal comprises a signal from a tachometer indicating RPM.

21. The automation control unit of claim 16 wherein the second controlled heating, ventilating, air-conditioning, and refrigeration device comprises a motor.

22. The automation control unit of claim 21 wherein the motor comprises a variable speed motor.

23. The automation control unit of claim 22 wherein the second input signal comprises a signal from a tachometer expressed as RPM.

24. The automation control unit of claim 16 wherein the first input and the second input are processed by the microcontroller.

25. The automation control unit of claim 16 further comprising a run output to turn on the controlled heating, ventilating, air-conditioning, and refrigeration device.

26. The automation control unit of claim 16 wherein the power connection comprises a 24 Volt power connection.

27. The automation control unit of claim 16 wherein one of the plurality of values of the digital adjustment profile comprises a scaling value, wherein the scaling value is used to scale an output percentage into engineering units for displaying on the display unit.

28. The automation control unit of claim 16 wherein one of the plurality of values of the digital adjustment profile comprises a minimum value allowed for the analog output signal.

29. The automation control unit of claim 16 wherein one of the plurality of values of the digital adjustment profile comprises a maximum value allowed for the analog output signal.

30. The automation control unit of claim 29 wherein one of the plurality of values of the digital adjustment profile comprises a minimum value allowed for the analog output signal.

31. The automation control unit of claim 16 wherein one of the plurality of values of the digital adjustment profile comprises a value indicative of a time delay for the analog output signal.

32. The automation control unit of claim 16 wherein one of the plurality of values of the digital adjustment profile comprises a value indicative of a number of pulses per turn for the analog output signal.

33. The automation control unit of claim 16 wherein one of the plurality of values of the digital adjustment profile comprises a ramping rate for the analog output signal.

34. The automation control unit of claim 16 wherein the manually operated adjust is converted into a voltage signal for providing to the building automation system.

* * * * *